United States Patent [19]

Kardos et al.

[11] Patent Number: 5,446,817
[45] Date of Patent: Aug. 29, 1995

[54] FORMED ALIGNMENT SLEEVE FOR FIBER OPTIC TERMINI

[75] Inventors: Louis F. Kardos, Fountain Valley; James T. Hartley, Tustin; Paul F. Mathews, Santa Ana, all of Calif.

[73] Assignee: General Motors Corporation, Detroit, Mich.

[21] Appl. No.: 311,227

[22] Filed: Sep. 23, 1994

[51] Int. Cl.⁶ ............................................. G02B 6/38
[52] U.S. Cl. ..................................................... 385/72
[58] Field of Search ...................... 385/62, 66, 67, 81, 385/84, 72

[56] References Cited

U.S. PATENT DOCUMENTS

| | | | |
|---|---|---|---|
| 4,193,665 | 3/1980 | Arnold | 385/72 |
| 4,205,898 | 6/1980 | Matthews et al. | 385/72 |
| 4,406,515 | 9/1987 | Roberts | 385/72 |
| 5,000,695 | 3/1991 | Nishiyama et al. | 439/276 |
| 5,080,035 | 1/1992 | MacManus | 116/328 |
| 5,107,536 | 4/1992 | Wall | 385/81 |

*Primary Examiner*—Rodney B. Bovernick
*Assistant Examiner*—John Ngo
*Attorney, Agent, or Firm*—William A. Schuetz

[57] ABSTRACT

An optical fiber connector assembly having a metal alignment sleeve for slidably receiving pin bushings of optical fiber termini to axially align the same in abutting engagement with each other to provide for good light transmission. The alignment sleeve is triangular in shape and slidably receives the pin bushings with a slight interference fit so that the sides of the sleeve are bowed slightly outwardly so that they exert a radially inwardly directed force against the bushings at three equidistant circumferential locations.

5 Claims, 3 Drawing Sheets

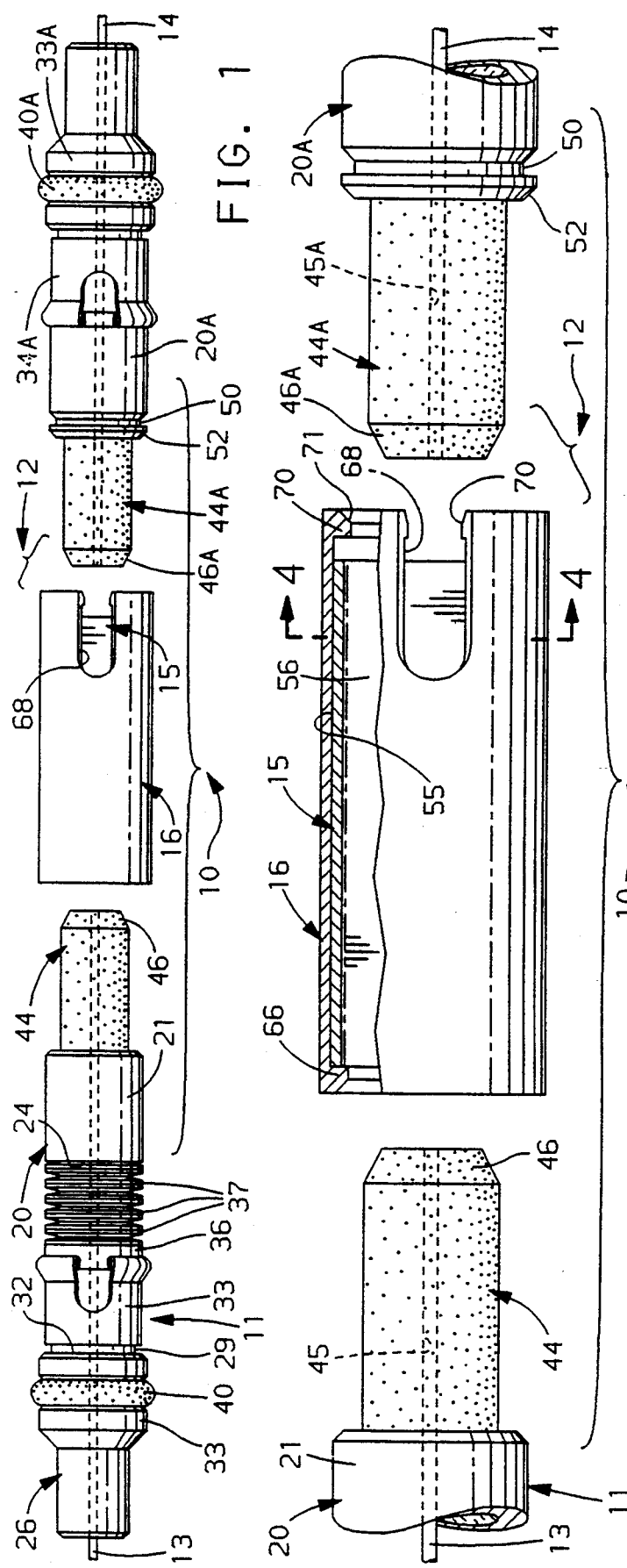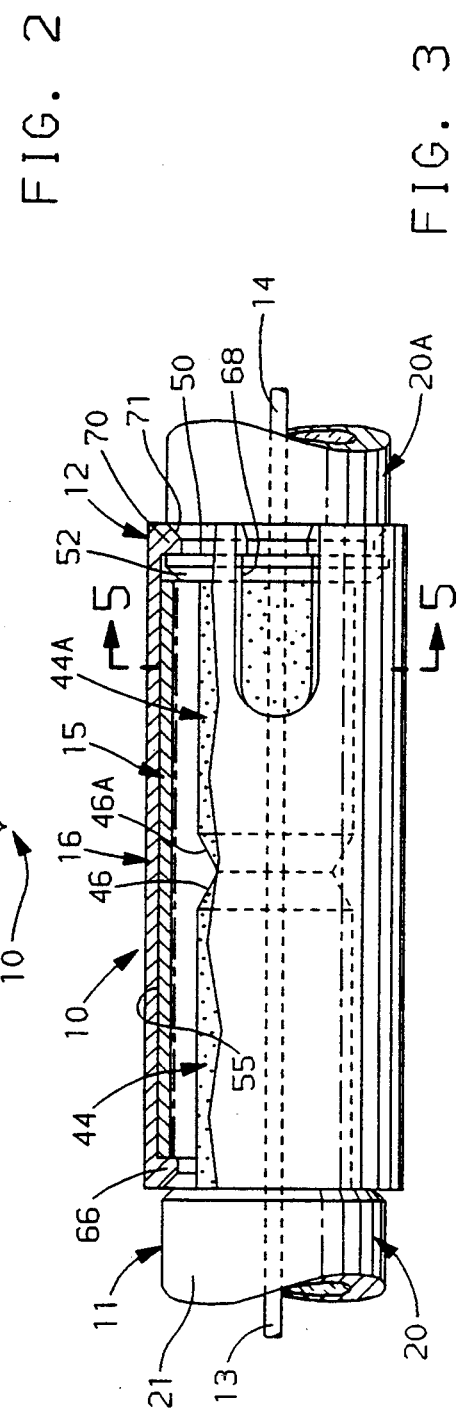

FORMED ALIGNMENT SLEEVE FOR FIBER OPTIC TERMINI

The present invention relates to optical fiber connector assemblies and, more particularly, to an optical fiber connector or termini assembly having a low cost formed alignment sleeve for axially aligning a pair of fiber optic termini when the latter are abuttingly engaged within the sleeve.

DESCRIPTION OF RELATED ART

Optical fibers commonly are connected by pin and socket type connectors which position the ends of two optical fibers in abutting engagement so that light can be transmitted from one to the other. One common type of connector assembly comprises a pin terminus having a forward end that is received within a socket at the forward end of a socket terminus to align the connectors together in abutting engagement. This alignment is usually accomplished by an alignment sleeve connected to one of the pin or socket terminus and which then receives the other terminus. These prior alignment sleeves have usually comprised axially slit cylindrical sleeves for slidably receiving pin bushings of the optical fiber termini with a slightly sliding interference fit.

When the optical fiber termini included metal pin bushings for centrally positioning the optical fibers, the axially split sleeves have usually been made of metal and with the sleeve being snap fittingly attached to one of the fiber optic termini. When the pin bushings for centrally positioning the optical fibers of the fiber optic termini were made from a ceramic material, the alignment sleeve comprised an axially slit cylindrical ceramic sleeve retained within an outer cylindrically shaped retainer sleeve and with the retainer sleeve being snapped fittingly connected to one of the termini.

Although the use of axially slit ceramic sleeves for aligning the ceramic bushings for fiber optic termini have been highly successful in operation, the usage of such sleeves is quite expensive. Accordingly, it is an object of the present invention to provide a low cost, formed metal alignment sleeve for accurately aligning the pin bushings of a pair of fiber optic termini so the ends are in aligned abutting engagement with each other with only a minimal loss of light transmission between the optical fibers.

It is another object of the present invention to provide such an alignment sleeve which can be used to both accept metal pin bushings as well as ceramic pin bushings.

SUMMARY OF THE INVENTION

The present invention provides an optical fiber connector or termini assembly having a novel low cost, metal, formed alignment sleeve for slidably receiving the pin bushings of optical fiber termini to both axially align the same and hold the same in abutting engagement with each other to provide for good light transmission from one optical fiber to the other optical fiber. The alignment sleeve comprises a one piece tubular, polygonal member, preferably triangular in shape, as viewed in cross section. The tubular sleeve has three resilient sides whose inner surfaces lie on an inscribed circle whose diameter is slightly less than the given diameter, i.e., the nominal diameter within tolerance limitations, of the pin bushings of the fiber optic termini so that when the pin bushings are inserted into the alignment sleeve, the sides of the alignment sleeve are bowed slightly outwardly so that they exert a radially inwardly directed force against the bushings at three equidistant circumferentially spaced locations on the bushings to maintain the bushings axially aligned. The triangular alignment sleeve is particularly useful for use with ceramic bushings to accurately align the optical fibers carried thereby. This in turn will allow the optical fibers to be axially aligned so as to minimize light transmission loss between the fibers.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 1 is a side elevational view of an optical fiber connector assembly embodying the novel alignment sleeve of the present invention;

FIG. 2 is an enlarged side elevational view, with parts shown in section, of part of the novel optical fiber connector assembly shown in FIG. 1;

FIG. 3 is a view like that shown in FIG. 2 but showing the optical fiber connector assembly connected together;

Figure 4:
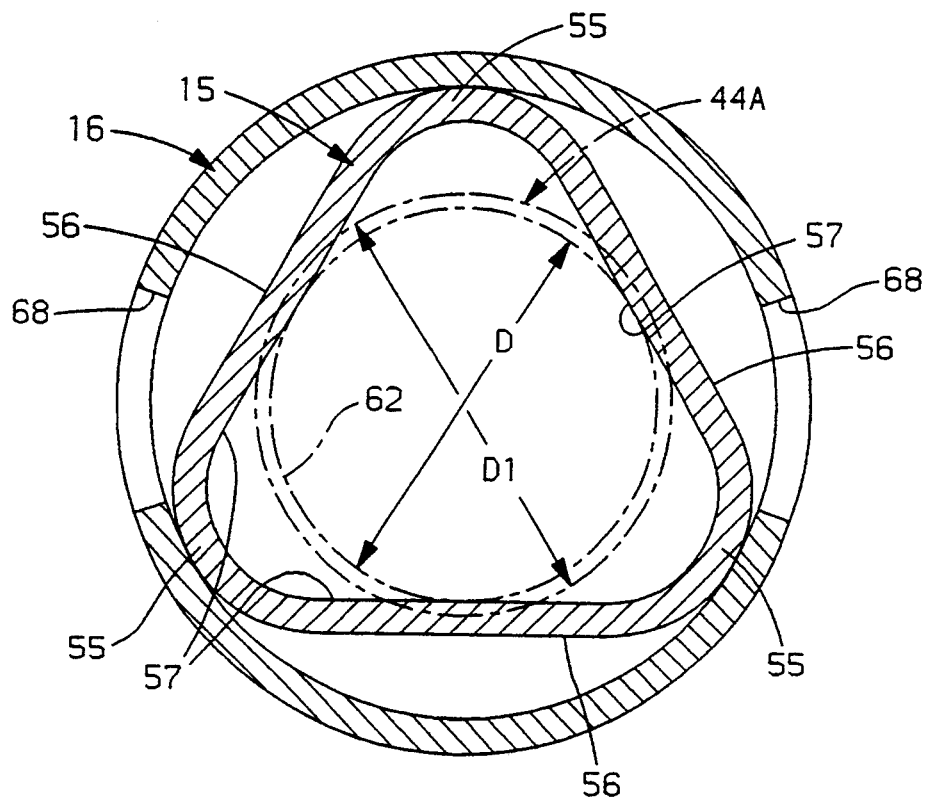
FIG. 4 is a cross sectional view taken approximately along the line 4—4 of FIG. 2.

Referring to the drawings, a novel optical fiber connector or termini assembly 10 is thereshown. The optical fiber connector assembly 10 comprises a first or pin terminus subassembly 11 that mates with a second or socket terminus subassembly 12 for interconnecting optical fibers 13, 14. The socket terminus subassembly 12 includes an alignment sleeve 15 and retainer 16 attached thereto for receiving the pin terminus subassembly 11 to position the optical fibers 13, 14 in abutting axial alignment.

Figure 6:
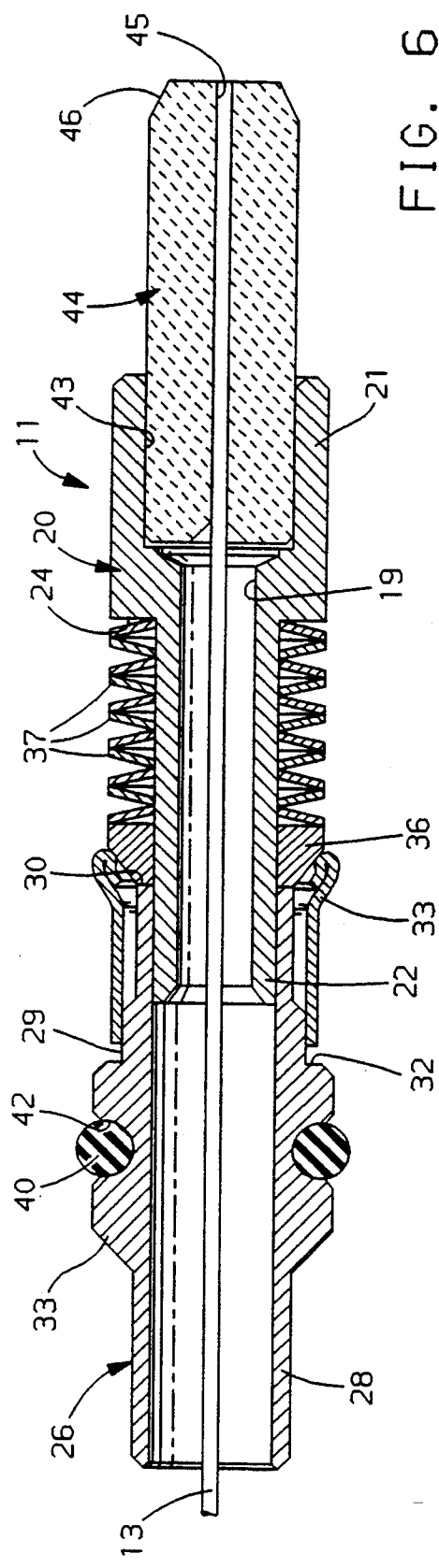
FIG. 6 is an enlarged axial cross-sectional view of one of the termini of the optical fiber connector assembly shown in FIG. 1.

As best shown in FIGS. 1 and 6, the pin terminus 11 includes a front connector body 20 of cylindrical shape and which has an axial bore 19 extending therethrough. The front connector body 20 has a forward portion 21 and a rearward portion 22 which is of a lesser diameter than the diameter of the forward portion 21 and which defines at its juncture therewith a radially extending shoulder 24. The pin terminus 11 also has a cylindrical rear connector body 26 having an axially extending bore 28 extending therethrough. The rear connector body 26 also has a reduced diameter portion 29 adjacent its forward end 30 which defines a radially extending shoulder 32 at its juncture with a rearward portion 33 of the rearward connector body 26. The rearward portion 22 of the front connector body 20 is received within the bore 28 of the rearward connector body 26 with a press fit.

A slotted retainer clip 33 circumscribes the forward portion 29 of the rearward connector body 26 and is disposed between the shoulder 32 and an annular collar 36 slidably retained on the rearward portion 22 of the front connector body 20. Also surrounding the rearward portion 22 of the front connector body 20 are a plurality of Belleville washers 37 which are slidable on the rearward portion 22 of the front connector body 20 and which are located between the collar 36 and the radial shoulder 24. The Belleville washers 37 function as a spring and engage the slotted clip 33 to bias the same radially outwardly. The retainer clip 33 functions to retain the pin terminus 11 against a shoulder or internal rib in a bore of a fiber optic connector housing (not shown), and in a manner which is conventional in the art. The pin terminus 11 also includes an annular O ring seal 40 contained within an annular groove 42 to provide a seal when connected to an associated connector body (not shown).

The front connector body 20 at its forward end is counterbored, as indicated by reference numeral 43, and receives an annular bushing 44 with a press fit. The bushing 44 has a central axial opening 45 whose diameter is just slightly larger than the diameter of the optical fiber 13 and has a tapered or chamfered forward end 46 whose taper progressively decreases preceding from its rearward end toward its forward end. The bushing 44 could either be a metal or a ceramic bushing. The optical fiber 13 is received through the central bores or openings 28, 19 and is slidably received within the central through opening 45 in the bushing 44. The fiber 13 after being positioned in the bushing 44 has its end polished and is adhesively secured therein. The optical fiber pin terminus subassembly 11 described above is conventional in the art and has been manufactured previously by the assignee of the present invention.

Figure 7:
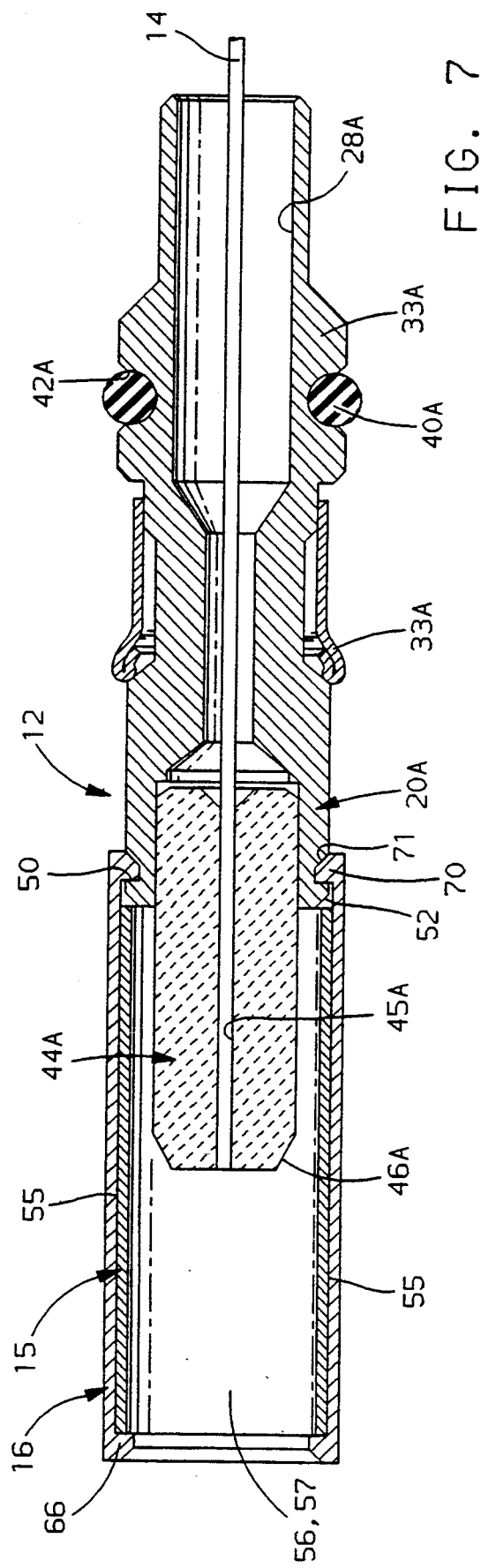
FIG. 7 is an enlarged axial cross-sectional view of the other of the termini of the optical fiber connector assembly shown in FIG. 1.

As best shown in FIGS. 1 and 7, the socket terminus 12 is of an identical construction to the pin terminus subassembly 11 except that the annular collar 36 and Belleville washers 37 are eliminated and except that the front connector body 20A has an annular groove 50 adjacent its forward end which is defined in part by a tapered collar 52. In all other respects the socket terminus 12 is of an identical construction and the same reference numerals will be employed, but with a suffix A attached thereto.

The alignment sleeve 15 and the retainer 16 are part of the socket terminus 12 because they are attached thereto prior to the pin terminus 11 being attached to the socket terminus 12.

In accordance with the provisions of the present invention, a novel alignment sleeve 15 is provided for axially aligning the bushings 44, 44A and optic fibers 13, 14. The alignment sleeve 15 comprises a linear metal tube which is preferably made from either beryllium copper or stainless steel. It is shaped from a cylindrical tube via suitable or conventional shaping tools to the triangular shape as best shown in cross section in FIGS. 4 and 5. The triangular sleeve has curved apexes 55 and has planar or straight sides 56. These sides have interior surfaces 57 which lie on an inscribed circle 62 whose diameter D is less than the given diameter D1 of the bushings 44, 44A. Given diameter means the nominal diameter within the plus or minus tolerance limitations normally associated with metal or ceramic bushings 44, 44A in fiber optic assemblies of this type.

The alignment sleeve 15 is adapted to be retained within a conventional metal, preferably stainless steel, retainer 16. The retainer 16 is cylindrical in shape and has an inwardly extending annular flange 66 at its left end, as viewed in FIGS. 2 and 3. The cylindrical sleeve 16 is slotted at diametral opposite locations along its right end portion, as denoted by the slots 68, and also has inwardly extending flanges 70 along its portions between the slots 68. The slots 68 render the right hand portion of the retainer 16 sufficiently flexible or resilient so as to enable the triangularly shaped alignment sleeve 15 to be inserted therein from right to left, as viewed in FIG. 2. The flanges 70 of the retainer 16 are inwardly beveled, as indicated at 71, so as to enable the portions between the slots to be more readily flexed radially outwardly when the alignment sleeve 15 is inserted into the retainer 16. The flanges 66, 70 of the retainer 16 serve to retain the alignment sleeve 15 against any significant axial movement relative to the retainer 16.

Figure 5:
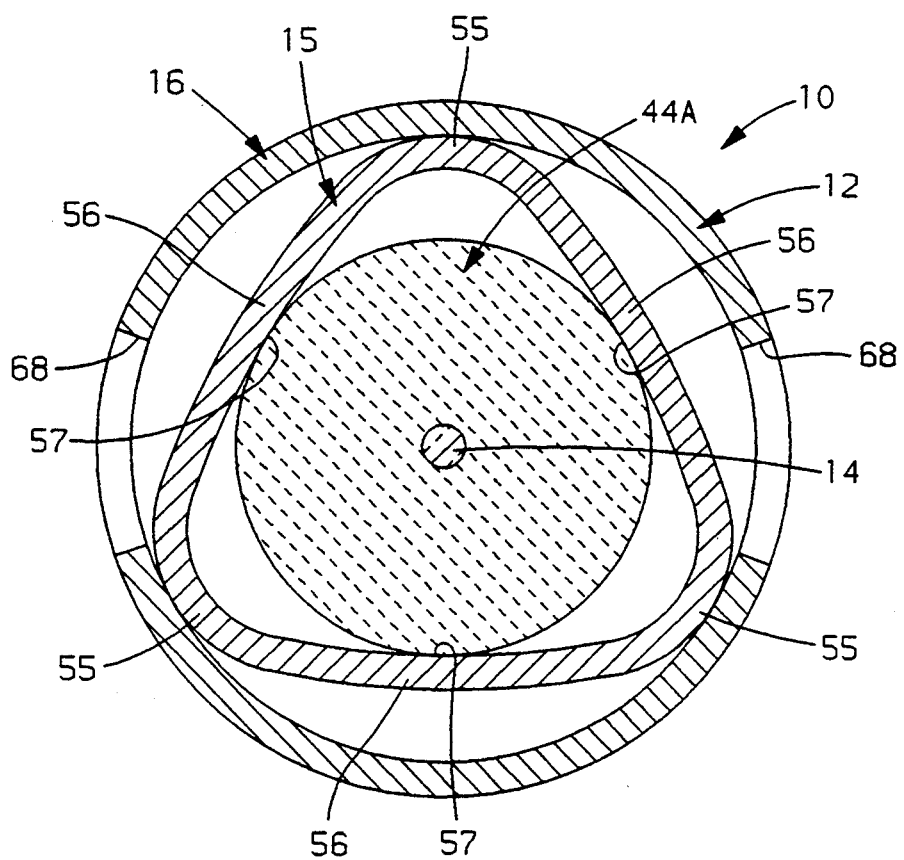
FIG. 5 is a cross sectional view taken approximately along lines 5—5 of FIG. 3.

The retainer sleeve 16 is retained onto the socket terminus 12 by snap fitting the inwardly directed flanges 70 past the shoulder 52 on the front connector body 20A of the socket terminus 12. The right end portions of the retainer 16 will be flexed outwardly upon engaging the shoulder 52 until the flanges 70 are radially aligned with the groove 50 whereupon the right end portions will return to their normal free state position, due to their inherent resiliency, and move the flanges 70 with a snap into the groove 50 behind the shoulder 52 to secure the retainer 16 on the pin terminus 12, as viewed in FIG. 3 or 7. When the alignment sleeve 15 and retainer 16 are connected to the socket terminus 12, the bushing 44A is also slidably connected to the alignment sleeve 15. The tapered forward end 46A facilitates entry of the bushing 44A into the alignment sleeve. The bushing 44A will engage the side walls 56 of the sleeve 15 at three equidistant circumferential locations and cause the same to be deflected radially outwardly from the position shown in FIG. 4 to the position shown in FIG. 5. This occurs because the alignment sleeve 15 is made from a resilient metal material. The alignment sleeve 15 perfectly centers the ceramic bushing 44A because it resiliently engages the same at three equidistant circumferentially spaced locations, as shown in FIG. 5, and with a slight interference fit.

Thereafter the pin terminus 11 is inserted into the alignment sleeve 15 in the same manner. When the two bushings 44, 44A are connected to the alignment sleeve 15 and their front faces are in abutting engagement, they will be virtually perfectly axially aligned and any light transmission loss between optical fibers 13, 14 is minimized.

Although the alignment sleeve 15 could be used with either metal or ceramic bushings 44, 44A, it is particularly useful with ceramic bushings, since it would replace a currently used axially slit ceramic sleeve. In addition, the metal alignment sleeve 15 is not as brittle as a ceramic alignment sleeve.

It should be noted that the alignment sleeve 15 could be made of other suitable polygonal shapes, if desired. However, the triangularly shaped alignment sleeve 15 is the preferred embodiment of the invention.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. An optical fiber termini assembly comprising a first optical fiber terminus having a forward guide bushing of a given diameter and a central through opening for centrally positioning an optical fiber when inserted therethrough, a second optical fiber terminus having a forward guide bushing of a given diameter and a central through opening for centrally positioning an optical fiber when inserted therethrough, a cylindrical retainer sleeve, and an alignment sleeve retained in said retainer sleeve for axially aligning said bushing of said first optical terminus with said bushing of said second terminus when the bushings are inserted into opposite ends of the alignment sleeve, the improvement being that said alignment sleeve comprises a metal tube which is of a constant and polygonal cross sectional shape throughout its axial length and whose sides lie on inscribed circle whose diameter is slightly less than the given diameters of said bushings, said sides of said polygonal shaped sleeve being resilient and being slightly outwardly bowed when said bushings are inserted therein so that they exert a radially inwardly directed force against said bushings at equidistant circumferentially spaced locations on said bushings to maintain the bushings accurately axially aligned, said retainer sleeve adjacent one end portion thereof having axially extending slots and beveled radially inwardly extending flanges extending between the slots at its one end and a radially inwardly extending flange at its other end for axially retaining said alignment sleeve within said retainer sleeve, said second terminus having a radially inwardly extending groove adjacent its forward guide bushing thereof which is defined in part by a beveled radially extending flange which engages and deflects the flanges at said end of said retainer sleeve until the groove is aligned with these flanges whereupon said flanges at said one end snap into the groove to connect said second termini to said retainer sleeve.

2. An optical fiber termini assembly, as defined in claim 1, and wherein said guide bushings are ceramic guide bushings.

3. An optical fiber termini assembly comprising a first optical fiber terminus having a forward ceramic guide bushing of a given diameter and a central through opening for centrally positioning an optical fiber when inserted therethrough, a second optical fiber terminus having a forward ceramic guide bushing of a given diameter and a central through opening for centrally positioning an optical fiber when inserted therethrough, a cylindrical retainer sleeve, and an alignment sleeve for axially aligning said bushing of said first optical terminus with said bushing of said second terminus when the bushings are inserted into opposite ends of the alignment sleeve, the improvement being that said alignment sleeve comprises a metal tube which is of a constant and triangular cross sectional shape throughout its axial length and whose three sides lie on inscribed circle whose diameter is slightly less than the given diameters of said bushings, said sides of said triangularly shaped sleeve being resilient and being slightly outwardly bowed when said bushings are inserted therein so that they exert a radially inwardly directed force against said bushings at equidistant circumferentially spaced locations on said bushings to maintain the bushings accurately axially aligned, and wherein said alignment sleeve is retained within said cylindrically shaped retainer, the retainer and said second terminus having cooperable means for snap fittingly securing the second optical fiber terminus to said retainer.

4. An optical fiber termini assembly, as defined in claims 1 or 3, and wherein said alignment sleeve is made from beryllium copper.

5. An optical fiber termini assembly, as defined in claims 1 or 3, and wherein said alignment sleeve is made from stainless steel.

* * * * *

UNITED STATES PATENT AND TRADEMARK OFFICE
CERTIFICATE OF CORRECTION

PATENT NO. : 5,446,817
DATED : August 29, 1995
INVENTOR(S) : Louis F. Kardos; James T. Hartley; Paul F. Mathews It is certified that error appears in the above-identified patent and that said Letters Patent is hereby corrected as shown below:

Cover page of patent, after "Assignee:" delete "General Motors Corporation, Detroit, Mich." and insert -- Packard Hughes Interconnect Company, Irvine, CA. --.

Signed and Sealed this

Fourteenth Day of May, 1996

*Attest:*

BRUCE LEHMAN

*Attesting Officer*     *Commissioner of Patents and Trademarks*